(12) United States Patent
Bunel et al.

(10) Patent No.: US 11,802,512 B2
(45) Date of Patent: Oct. 31, 2023

(54) SPARK PLUG FOR A SINGLE-PIECE COMBUSTION CHAMBER

(71) Applicant: SAFRAN AIRCRAFT ENGINES, Paris (FR)

(72) Inventors: Jacques Marcel Arthur Bunel, Moissy-Cramayel (FR); William Louis Rodolphe Dousse, Moissy-Cramayel (FR); Dan-Ranjiv Joory, Moissy-Cramayel (FR); Benjamin Frantz Karl Villenave, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/919,463

(22) PCT Filed: Apr. 13, 2021

(86) PCT No.: PCT/FR2021/050646
§ 371 (c)(1),
(2) Date: Oct. 17, 2022

(87) PCT Pub. No.: WO2021/209711
PCT Pub. Date: Oct. 21, 2021

(65) Prior Publication Data
US 2023/0151770 A1     May 18, 2023

(30) Foreign Application Priority Data

Apr. 17, 2020 (FR) ........................ 2003878

(51) Int. Cl.
*F23R 3/60* (2006.01)
*F02C 7/266* (2006.01)
(Continued)

(52) U.S. Cl.
CPC .............. *F02C 7/266* (2013.01); *F23R 3/002* (2013.01); *F23R 3/50* (2013.01); *F23R 3/60* (2013.01);
(Continued)

(58) Field of Classification Search
CPC .. F23R 3/002; F23R 2900/00017; F23R 3/50; F23R 3/60; F23R 3/283
See application file for complete search history.

(56) References Cited

U.S. PATENT DOCUMENTS

| | | | |
|---|---|---|---|
| 6,397,603 B1 * | 6/2002 | Edmondson | F23R 3/60 60/753 |
| 2009/0151361 A1 * | 6/2009 | Audin | F23R 3/002 60/740 |

(Continued)

FOREIGN PATENT DOCUMENTS

| | | | | |
|---|---|---|---|---|
| FR | 2988436 A1 * | 9/2013 | ............. | F23Q 3/008 |
| FR | 2988436 A1 | 9/2013 | | |

OTHER PUBLICATIONS

English translation of FR 2988436 provided by Espacenet (Year: 2013).*

(Continued)

*Primary Examiner* — Thomas P Burke
(74) *Attorney, Agent, or Firm* — Cozen O'Connor

(57) ABSTRACT

The invention relates to a combustion chamber for a gas turbine engine, in which two openings extend through a metal wall (58) and a wall made of a refractory material (16). A device (76) guides a spark plug (48) in said two orifices, the guiding device comprising a metal flange (80) and a floating ring (82), the flange being shrunk onto or welded to the metal wall (58).

13 Claims, 5 Drawing Sheets

(51) Int. Cl.
*F23R 3/00* (2006.01)
*F23R 3/50* (2006.01)

(52) U.S. Cl.
CPC .... *F05D 2220/323* (2013.01); *F05D 2240/35* (2013.01); *F05D 2260/99* (2013.01)

(56) References Cited

U.S. PATENT DOCUMENTS

| | | |
|---|---|---|
| 2011/0120132 A1 | 5/2011 | Rudrapatna et al. |
| 2013/0055716 A1* | 3/2013 | Gerendas .............. F23R 3/60 60/722 |
| 2016/0115874 A1 | 4/2016 | Bandaru |

OTHER PUBLICATIONS

International Patent Application No. PCT/FR2021/050646, International Search Report and Written Opinion dated Aug. 5, 2021, 11 pgs.

French Patent Application No. FR2003878; Search Report dated Mar. 1, 2021; 9 pgs.

* cited by examiner

SPARK PLUG FOR A SINGLE-PIECE COMBUSTION CHAMBER

CROSS-REFERENCE TO RELATED APPLICATIONS

This application is a 35 U.S.C. § 371 filing of International Application No. PCT/FR2021/050646 filed Apr. 13, 2021, which claims the benefit of priority to French Patent Application No. 2003878 filed Apr. 17, 2020, each of which is incorporated herein by reference in its entirety.

DISCLOSURE OF THE INVENTION

The present invention relates to a combustion chamber for a gas turbomachine, such as an aircraft turbojet or turboprop engine, in which fluids (such as air and at least one fuel) flow generally from upstream to downstream to operate it. In the text, upstream and downstream are to be considered along what is hereinafter referred to as "the first axis" or "axis X", which is the general axis of the turbomachine.

Upstream is the side from which the air and fuel mixture enters the combustion chamber. "Outer" and "inner" are to be understood as radially relative to said first axis (X). Outer is what is radially further away from this first axis than what is inner.

This being said, such aircraft gas turbomachine parts are already known, having a first axis (X) and comprising:
  an outer casing (12),
  an inner casing (14), both annular, coaxial with said first axis (X), and
  a space (9) surrounding an annular combustion chamber (10) about the first axis (X),
the space (9) being delimited between the outer casing (12) and the inner casing (14),
the annular combustion chamber comprising:
  respectively inner and outer annular walls radially to the first axis (X),
  an annular chamber bottom (wall) extending between said inner and outer annular walls and having first openings for the passage of devices for injecting an air and fuel mixture at least partly attached to the annular chamber bottom,
  a deflector, disposed downstream of the chamber bottom, to thermally protect the chamber bottom, and having second openings for aforementioned inner and outer annular walls delimit the combustion area of the combustion chamber.

Furthermore, the chamber bottom overall actually includes ports for the passage of the air (A)/fuel (C) mixture towards the combustion area of the combustion chamber, air (A) coming from a compressor of the turbomachine and fuel (C) being supplied by injectors.

By definition, the chamber bottom (CB) is the member:
  to which said devices for injecting the air/fuel mixture are attached, and
  with which said respectively inner and outer annular walls are attached. It is a structural bottom.

The chamber bottom undergoes high thermal stresses which can deform it. It is therefore common to protect it thermally (from the flame in the combustion area) by means of a deflector (or a circle of deflectors) mounted just downstream of the CB.

In spite of this, clearances may occur (especially with said respectively inner and outer annular walls), which generate problems of pollution, fuel consumption, and re-ignition of the chamber in case of flameout.

Moreover, it is necessary to be able to initiate the combustion of the air/fuel mixture in the combustion area of the combustion chamber, or even to feed it with an additional amount of fuel, downstream of the CB.

To this end, it is known that one of said respectively inner and outer annular walls (typically the outer wall) includes at least one port for the passage towards the combustion chamber of one end of (at least) one energy feed element (spark plug for said mixture and/or fuel injector), the other end of which may be attached to an outer casing of the chamber.

During operation of the turbomachine, the walls of the combustion chamber expand thermally, which causes relative displacements between the pieces.

To compensate for and allow these displacements, EP-A-1770332 suggests using at least one guiding device which comprises, for guiding the energy feed element in question into the port of the annular wall through which it passes:
  a metal flange, and
  a floating bushing, floatingly mounted in the flange, the floating bushing and the flange having the energy feed element passing coaxially therethrough, the flange being shrink fit or welded to said annular wall, which is typically a metal wall.

The term welding encompasses both soldering and actual welding.

In this context, the purpose of the invention is to provide an effective and economical solution to at least some of the following problems and drawbacks:
  improved service life of the combustion chamber,
  reduction of parasitic gas leakage in the zone of the equipped CB,
  reduction of pollution,
  reduction of fuel consumption,
  improved chamber ignition and re-ignition conditions,
  control of the overall mass of the combustion chamber,
  control of the way the combustion chamber is manufactured,
  good mechanical strength,
  improved resistance to thermal stresses,
  management of the contacts between metal and refractory material (such as a ceramic); indeed, these contacts make it complex to attach the guiding device of the energy feed element (a device often referred to as a spark plug guide) to a refractory material wall. US2013055716 certainly teaches a turbomachine part as set forth above and in which the combustion chamber comprises:
  respectively inner and outer annular refractory material walls, radially to the first axis (X),
  an annular chamber bottom extending between said inner and outer refractory material walls and having first openings for the passage of devices for injecting an air and fuel mixture partly attached to the annular chamber bottom,
  first respectively inner and outer annular metal connecting walls, radially to the first axis (X), to which are attached:
    said refractory material walls, respectively, and
    the chamber bottom,
the combustion chamber furthermore comprising:
  two ports passing coaxially through, respectively (along an axis which may intersect the axis X):
    one of the first metal connecting walls, and
    one of said refractory material walls which it covers, and a guiding device, for guiding an energy feed element into said two ports.

However, US2013055716 does not disclose that, as taught by the invention, the guiding device is attached with one of said first metal connecting walls.

By means of the invention, especially excessive mechanical load on the annular refractory material wall through which the port for the passage of the energy feed element in question passes will be avoided and a solution will have been provided to the problem of attachment of the guiding device of the energy feed element to a refractory material wall.

It should also be noted that the single-piece aspect between said deflector and said respectively inner and outer annular refractory material walls:
should make it possible to obtain control of geometric tolerances of the combustion area, especially: elimination of welding operations, maintenance of the volume of the chamber to respect favourable re-ignition limits, in case of in-flight flameout,
can avoid the need to use a thermal protection barrier coating (made especially of yttrium zirconate),
implies that said refractory material "deflector", by becoming the annular "bottom" of the combustion area of the combustion chamber (denoted as 21 hereafter), continues to act as a deflector, protecting the metal, structural "chamber bottom" (or CB, denoted as 20 hereafter), which is itself annular, and which is thus not directly exposed to thermal radiation. The term "deflector" is therefore appropriate. The term "bottom of the single-piece assembly" has also been used hereafter to avoid confusion with the "chamber bottom, or CB, 20".

Favourably, such a single-piece assembly will be made of (that is, based on) refractory material, which may be (may comprise) a ceramic matrix composite (CMC). The wall thickness could be between 0.9 mm and 1.6 mm.

To secure the attachment of the guiding device, it is advisable that said guiding device comprises a metal flange and a floating bushing floatingly mounted in the flange, the floating bushing and the flange being adapted to have the energy feed element passing coaxially therethrough, the flange being attached with one of said first metal connecting walls.

Still to secure this attachment, it is favourably by shrink fit or by welding that the guiding device—the flange if provided—will be attached with one of said first metal connecting walls.

Moreover, favourably:
the combustion chamber will also comprise a refractory material deflector, disposed (axially) downstream of the chamber bottom, to protect it thermally, and having second openings for the passage of the fuel injection devices,
said deflector and said refractory material walls may form a single-piece assembly.

Again, in order to further secure the attachment of the guiding device without significantly stressing the refractory material wall, it is also provided that an intermediate attachment bushing is provided:
attached, preferably shrink fit or attached by welding, to the flange and to said first annular metal connecting wall through which the energy feed element in question passes, and
which itself will have the energy feed element passing therethrough.

By interposing such an intermediate bushing, a priori a metal bushing like the flange, between this flange and said first connecting wall, also a metal wall, mounting the guiding device as a whole will be facilitated.

Also, for the same purpose as above, it is even provided that:
the flange has a shank (also called a chimney) parallel to the axis of said two coaxial ports and which is engaged in the port of said first metal connecting wall through which the energy feed element passes, and
the attachment bushing is shrink fit or welded to said wall and said shank, by being thus interposed between them.

It is also provided that, in parallel to the axis of said two ports, the shank of the flange is interrupted at a distance from said annular refractory material wall through which it passes and which faces it.

In addition, to facilitate mounting of the flange and to limit mechanical weakening of the refractory material wall as much as possible, it is also provided that, of said two ports, that which passes through said first metal connecting wall in question has a larger diameter than that which passes coaxially through the refractory material wall located opposite.

In other words, the port present in one of the first metal connecting walls will advantageously have a larger diameter (D2) than the diameter (D1) of the port present in one of said annular refractory material walls.

In order to limit interference between the attachment bushing and this refractory material wall, it is also provided:
that the attachment bushing has an internal diameter (D1), an external diameter (D2) and a thickness (e) between the internal (D1) and external (D2) diameters, and
that the difference in diameters between said two ports is greater than the thickness (e) of the attachment bushing.

Thus, the attachment bushing will not project into the space of the ports reserved for the possible clearance of the energy feed element.

Moreover, in order to position the flange in the best possible way and to facilitate its mounting, it is also provided that, in parallel to the axis of said two ports, the attachment bushing has a height (H1) greater than the height of the shank, in order to avoid possible contact between the metal and the refractory material (ceramic).

The height (H1) of the attachment bushing may also be greater than the thickness of said first metal connecting wall to which it is thus attached and which surrounds it adjacently. Thus erected, preferably radially outwards above this first metal connecting wall, the bushing can especially serve as a support for mounting the guiding device of the energy feed element in question.

In this respect, it is even provided that, in the operational situation, the shank of the flange is supported by the attachment bushing via a flare present on the flange.

In addition, for this purpose of support and/or controlled clearance of said energy feed element in its guiding device, it is also provided:
that the floating bushing has an external edge guided transversely into an internal annular groove of the flange,
that the shank of the flange flares to define a bottom of said groove and peripherally extends to a flanged edge where a cup is attached, so that said edge of the floating bushing is guided between said bottom and the cup, and
the flare of the shank of the flange is located outside the attachment bushing.

Another aspect relates to the mechanical strength of said first metal connecting wall and the connection between this wall and the refractory material wall which it covers, which itself has the energy feed element in question passing therethrough.

To this end, it is provided that, along said covered annular refractory material wall, the port which passes through said first metal connecting wall is formed in a first covering tab which protrudes relative to a second covering tab:
- in turn protruding relative to a part of said first metal connecting wall which extends circumferentially about said first axis (X), and
- where, on either side of the first covering tab, attachment pins attach, by passing therethrough, said first metal connecting wall and the annular refractory material wall which it covers, to each other.

Generally speaking, it should be possible to expect from the above:
- a reduction in costs and overall mass,
- as well as a better control of the geometric tolerances of the combustion area.

Furthermore, in addition to the combustion chamber described above, the invention also relates to an aircraft gas turbomachine equipped with this combustion chamber.

BRIEF DESCRIPTION OF THE FIGURES

The invention will, if necessary, be better understood and other details, characteristics and advantages of the invention will become apparent upon reading the following description, which is given by way of non-limiting example with reference to the appended drawings, where.

DETAILED DESCRIPTION OF THE INVENTION

Figure 1:
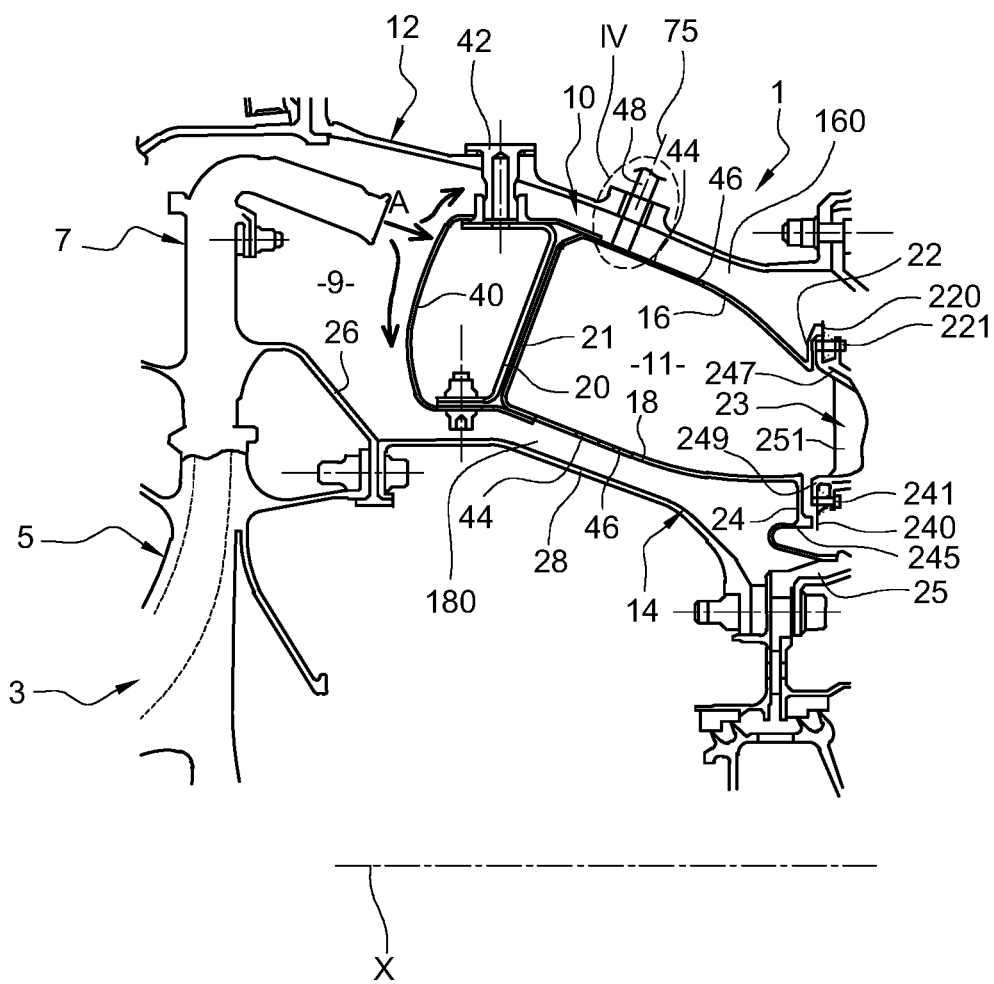
FIG. 1 is a schematic axial cross-section half-view (axis X) of a turbomachine "combustion module", comprising a combustion chamber in accordance with the invention.

In the embodiment in FIG. 1, the part 1 of an aircraft turbomachine has a space 9 surrounding an annular combustion chamber 10 and which receives a flow of air A, which will, at least in part, supply the combustion area 11 of the chamber 10. The space 9 is delimited between an outer casing 12 and an inner casing 14, both annular, coaxial to the axis X of the turbomachine.

In the space 9, the part 1 of the turbomachine comprises a compressor 3—which may be a high-pressure compressor disposed axially following a low-pressure compressor—the downstream part of which (visible in the figure) comprises a centrifugal stage 5, an annular diffuser 7 connected downstream of the compressor 3. The diffuser 7 opens into the space 9. Together with the outer casing 12 and the inner casing 14, said part 1 can be called a "combustion module".

Figures 2, 3:
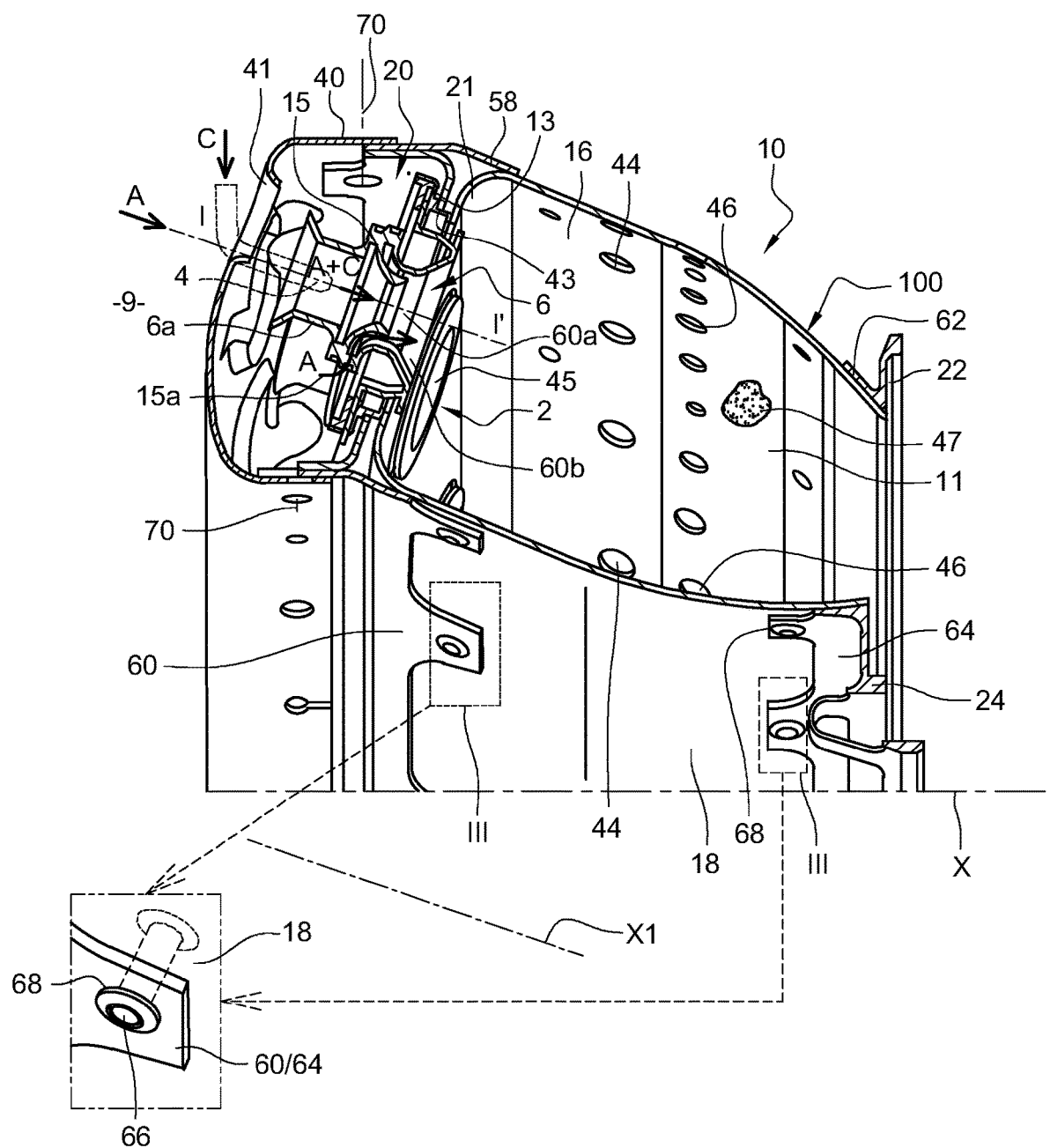
FIG. 2 is a view identical to that of FIG. 1, but angularly offset about the axis X and of the combustion chamber alone.
FIG. 3 is detail III of FIG. 2.

Compressed air (A) from the compressor 3 is introduced into the combustion chamber 10 where it is mixed with fuel (C) from injectors, such as the injectors 4 in FIG. 2. Gases from the combustion are directed towards a turbine (here a high-pressure turbine) located downstream (DO) of the outlet of the chamber 10, and first towards a distributor 23 which is a part of the stator of the turbomachine.

The chamber 10 comprises an annular outer wall 16 and an annular inner wall 18, both made of refractory material.

As understood, the outer casing 12, the inner casing 14, the space 9, the outer wall 16 and the inner wall 18 each form a ring about the first axis X.

The outer 16 and inner 18 walls are therefore not annular about each axis I-I' which defines the axis of each of the injectors 4 for injecting fuel into the combustion chamber 10.

The annular outer 16 and inner 18 walls are connected upstream to the bottom 21 which is itself annular about the first axis X.

The bottom 21 forms the bottom of the combustion area 11.

The combustion chamber 10 is held:
- on the upstream side by spindles 42 attached to the outer casing 12 and to the walls shown below 58, 60 and/or to the CB 20, and
- on the downstream side by attachment flanges.

Through the outer and inner annular flanges 22 and 24 respectively, and at the downstream end, the chamber 10 is axially supported by outer and inner annular shells respectively, of a distributor, here the high-pressure distributor 23, via sealing lamellas 220, 240 connected to said outer and inner annular flanges 22 and 24 respectively. These flanges are axially supported by axial pins 221, 241, respectively, with which the outer 247 and inner 249 annular shells are equipped. As could be done externally by the outer annular flange, the radially inner annular flange 24 extends, radially inwardly with respect to the sealing lamellas 240, to an annular support member 245 in the form of a peg open downstream side, which is supported by a casing 25, called the HP distributor support casing. Between the outer and inner annular shells of the distributor 23, which is attached otherwise, substantially radial blades 251 extend.

Moreover, the inner casing 14, which runs along the chamber 10, can be considered as being defined by, or comprising, the shell 26 of the diffuser and an inner intermediate web 28 attached upstream of the shell 26 and downstream of the casing 25. In the upstream part (UP), the combustion chamber 10 can be attached by at least three attachment spindles 42 circumferentially distributed about the axis X, the axis around which the movable vanes of turbine(s) and compressor(s) especially rotate.

According to a specificity of the combustion chamber 10 set forth here, the outer annular wall 16, the inner annular wall 18 and the annular bottom 21 (of the combustion area 11) forming a deflector define a single-piece refractory material assembly 100.

Just upstream of the bottom 21 of the combustion area is the annular metal chamber bottom 20 to which devices 2 for injecting an air and fuel mixture, hereinafter referred to as injection devices 2, are attached and circumferentially distributed about the axis X.

This attachment can be done by direct attachment (clamping) of bowls 6 provided on the injection devices 2.

Each injection device 2 may thus comprise a bowl 6 which comprises a venturi 60a and terminates towards the combustion area 11 with a divergent 60b, for bursting the received air and fuel mixture jet.

Following the cross-section of FIG. 2, circumferentially offset and passing through the axis of one of the injection devices 2, it can be seen that the combustion chamber 10 thus comprises such injection devices 2 which (at least for the bowls 6) pass through first passage openings 43 formed in the chamber bottom 20 and then, coaxially, through second passage openings 45 formed through the combustion area bottom 21, without the (bowls 6 of the) injection devices 2 being attached directly with the bottom 21.

The bowl 6, the fuel outlet engaged therein and the first and second openings 43, 45 are coaxially centred on an axis I-I' which is parallel to an axis X1 in parallel to which the single-piece outer annular wall 16 and the inner annular refractory material wall 18 generally extend.

An intermediate space 56 separates the CB 20 and the combustion area bottom 21, along this axis I-I'.

The bowls 6 are mounted tightly (attached) in coaxial sleeves 13 disposed in the openings 43 and themselves attached to the CB 20. An axial clearance J can be reserved between each sleeve 13 and the combustion chamber bottom 21. In this way, contact with fragile refractory material and metal can be avoided.

A fuel injector 4 is mounted in the inlet channel 6a of the bowl 6 of each of the injection devices 2, the outlet of which injector, like the channel 6a, is oriented along the corresponding axis I-I'.

Around its inlet channel 6a, the bowl also has one or more air A inlet spinning members 15 passing therethrough.

The peripheral spinning member(s) 15 can allow a part of the air A received from the space 9 to be introduced into the bowl 6 (a priori towards the venturi 60a) and with a spinning movement (arrow 15a).

An annular cowl 40 having openings 41 passing therethrough, letting the injectors 4 and the air A pass towards the bowls 6, can also be provided. The openings 41 may each be coaxial with a so-called axis I-I'.

For the supply of air A to the combustion area 11 through the annular volumes 160 and 180 which exist respectively:
between the outer wall 16 and the outer casing 12, and
between the inner wall 18 and the inner casing 14,
(The part(s) forming the inner 18 and/or outer walls 16, respectively, of the single-piece assembly 100 may furthermore have primary holes 44 and/or dilution holes 46 passing therethrough, which holes open into the combustion area 11. Some multi-perforation ports 47″, for injecting cooling air into the combustion area, have also been shown locally. If they exist, they extend over a much larger surface area, as known.

For a connection—with controlled (mechanical/thermal) stresses and manufacture—between the single-piece assembly 100 and the surrounding metal parts of the turbomachine (if they exist: spindles 42, lamellas 220,240 . . . ), it is provided:
that, towards the upstream end of the combustion chamber 10, first inner and outer annular metal connecting walls 60 and 58, respectively, may connect together the CB 20 and the inner and outer walls 18 and 16, respectively, or even also the cowl 40 located therefore upstream of this CB, and/or
that, towards the downstream end of said chamber, there are provided second inner and outer metal connecting walls 64 and 62 respectively, having inner 24 and outer 22 flanges, respectively, for connection:
between said inner wall 18 and a metal strain-take-up piece, such as the injector casing 25, and
between said outer wall 16 and a part of the DHP (outer annular shell 247) and/or the outer casing 12.

The connecting metal walls 58,60,62,64 will be flexible sheets, more deformable than the refractory material of the assembly 10, when the turbomachine is operating.

Again, for these metal/refractory material connection issues, it is provided, for the connections between said inner 18 and outer 16 walls and the inner 60,64 and outer 58,62 connecting metal walls, respectively, to use pins 66 and washers 68 attached together (for example welded) and passing through holes provided in the respective walls.

By contrast, connections between the (metal) CB 20 and the first metal inner 60 and outer 58 connecting walls respectively (or even with the metal cowling 40), will preferably be ensured a priori by screw-nut assemblies 70 which will pass therethrough.

Furthermore, at least one further passage double port 72,74 passes coaxially through:
one of the first respectively inner 60 and outer 58 annular metal connecting walls (port 72), and, opposite
one of said respectively inner 18 and outer 16 annular refractory material walls (port 74), to dispose therein an energy feed element 48 which may typically comprise a spark plug or a fuel injector.

Figure 4:
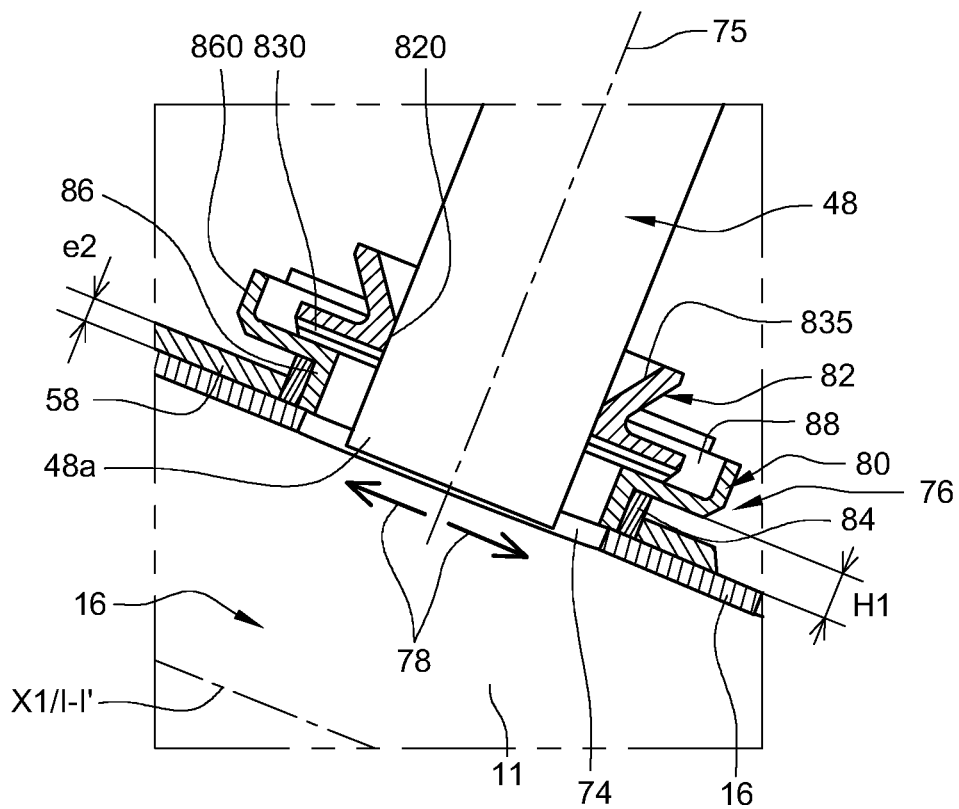
FIG. 4 is detail IV of FIG. 1.

The free end 48a of the energy feed element 48 is flush with the inner face of the relevant refractory material wall (16 in the example), to communicate with the combustion area 11; FIG. 4.

For easier mounting, the wall 58 will cover the wall 16 and the wall 60 will cover the wall 18, as seen especially in FIG. 4 and following for the wall 58 facing the wall 16, in this example where they have said element 48 passing therethrough, generally along their common axis 75 which intersects the axis X and which may be perpendicular to the axis X1.

Hereafter, it will be considered for example that the element 48 is a spark plug which opens by its inner end into the combustion area 11.

In fact, the air and fuel mixture injected into the combustion chamber 11 will be ignited by means of at least one spark plug, such as the spark plug 48, which may extend radially to the axis X1, outside the chamber.

The radially outer end of the spark plug 48 may be attached to the outer casing 12 outside of which it is connected to power supply means (not represented).

At its radially inner end (thus relative to the axis X1 or I-I'; see FIG. 4), the spark plug 48 is guided into the ports 72,74.

For this purpose, a guiding device 76 is attached outside the chamber 10 to the metal wall 58, around the port 72 to compensate for the relative displacements between the walls of the chamber and the spark plug 48 during the operation of the turbomachine. These relative displacements occur mainly in the longitudinal direction, substantially parallel to the axis X1; see arrows 78 in FIG. 4.

The guiding device 78 is a priori a metal device. It comprises a flange 80 and a bushing 82 floatingly mounted in the flange 80 to allow the displacement of the spark plug 48 substantially parallel to the axis I-I', held/secured by a neck 820 of the floating bushing. The floating bushing 82 and the flange 80 have the spark plug 48 passing coaxially (axis 75) therethrough.

To avoid interference with the refractory material walls 16, 18, the flange 80 is shrink fit or welded to (in the example) the outer metal connecting wall 58.

Figure 6:
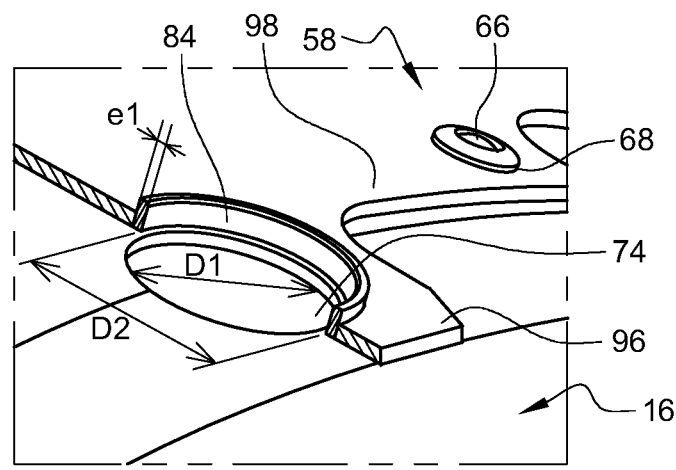
FIG. 6 shows the zone in FIG. 5 in partial cross-section enlarged view.

To facilitate this attachment and to secure it, it is advisable to use an intermediate attachment bushing 84, which may be a metal bushing, itself shrink fit or welded to the flange 80 and to said metal connecting wall; the outer wall 58 in said example (see FIG. 6).

Thus, the intermediate attachment bushing 84 is disposed closely in the port 72. It may be supported by the wall 16, just around the port 74.

The floating bushing 82 has an outer edge 830 which moves freely, transversely to the axis 75 (substantially parallel to the axis I-I'), in an internal annular groove 88 of the flange 80.

The neck 820 is at the junction between the central zone of the edge 830 and that of a possible frustoconical part 835 for guiding the initial axial engagement of the element 48 into the floating bushing 82.

The flange 80 may have a shank or chimney 86 by which it is attached to the metal wall 58, preferably via the intermediate attachment bushing 84 (shank/bushing attachment by brazing, preferably welding).

To form the groove 88, the shank 84 of the flange:
flares (via a shoulder) to define a bottom 840 of the groove 88, and
peripherally extends to a flanged edge 860 to which a cup 90 is attached (a priori soldered or welded), so that the edge 830 of the floating bushing can be guided between the bottom 840 and the cup 90, into the groove 88.

The flare (that is, the bottom 840) of the shank of the flange is located outside the attachment bushing 84: along the axis 75, beyond the free end of the bushing 84 on which the bottom 840 can rest.

The shank 86 may be cylindrical.

For secure positioning, it is provided:
that, in parallel to the axis of the element 48 and said two ports 72, 74, the shank 86 of the flange 80 is interrupted at a distance from the refractory material wall in question: space 92 between the free end of the shank and the facing wall, 16 in this case; and/or
that the port 72 which passes through said (first) metal connecting wall (58 in the example) has a diameter D1 which is larger than the diameter D2 of the port 74 which passes coaxially through the facing refractory material wall (16 in the example); see FIG. 6. Thus, there is a support 94 (FIG. 5) on which to push the attachment bushing 84 during positioning before attachment to the wall 58.

Moreover, it may be desired to limit the projection of the flange 80 into the ports 72, 74. For this purpose, it is provided:
that the attachment bushing 84 has an internal diameter, an external diameter and a thickness e1 between the internal and external diameters (FIG. 6), and
that the difference in diameters between said two ports 72,74 (shoulder formed by the edge 94 FIG. 5) is greater than the thickness (e) of the attachment bushing 84: see FIG. 6.

And to facilitate the installation of the flange 80, it is furthermore provided that, in parallel to the axis 75 of said two ports 72, 74, the attachment bushing 84 has a height (H1) greater than the thickness e2 of said corresponding (first) metal connecting wall (58 in the example; see FIG. 6).

Figure 7:
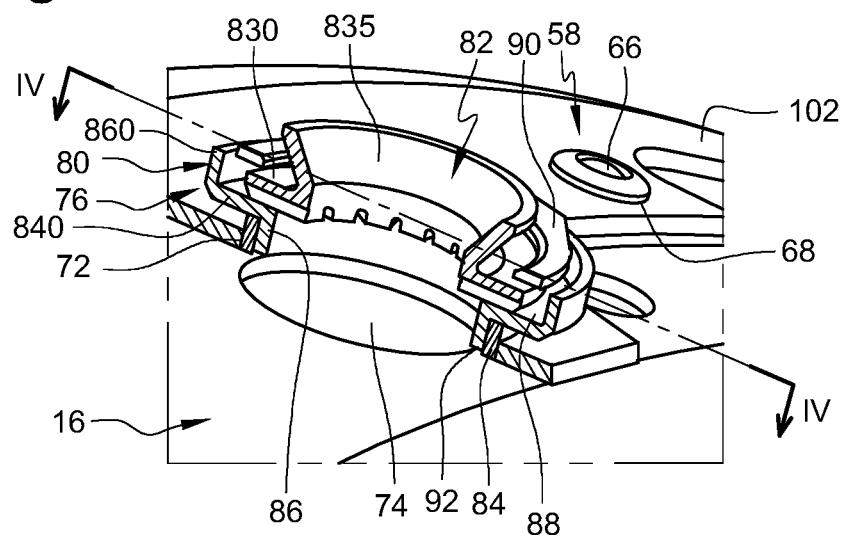
FIG. 7 is the same view as FIG. 6, after mounting the guiding device of the energy feed element.

In this way, it can be provided that the flare (bottom 520) of the shank 86 of the flange is supported by the attachment bushing 84, along the axis 75; see FIG. 4 or 7.

The question of the mechanical strength related to the presence of the single-piece assembly 100 has also arisen with regard to the mechanical weakening caused by the port 72 provided in the relevant metal connecting wall: 58 in the example.

To overcome this, it is provided that, along the covered annular refractory material wall (wall 16 in the example), said port 72 is formed in a first covering tab 96 which protrudes downstream relative to a second covering tab 98:
in turn protruding relative to a part 102 of said first metal connecting wall (58 in the example) which thus extends circumferentially about said first axis X, and
where, on either side of the first covering tab 96, attachment pins 66 (held by washers 68) pass through and attach said first metal connecting wall (58 in the example) and the annular refractory material wall (16 in the example) which it covers, to each other.

This characteristic may be important.

Thus, it may be advantageous for the (protrusion formed by the) first covering tab 96:
to be only local to enable the guiding device of the energy feed element (spark plug guide) to be attached,
and thus, not to extend continuously over the entire circumference.

Thus, the problems of weight, friction and thermal expansion are reduced.

Favourably, said first metal connecting wall (58 in the example) will thus extend, axially:
over a first length X10, over most of its perimeter about the axis X,
locally along a second length X20 to enable it to be attached (in the form of a tab: second covering tab 98), and
along a third length X30, even more locally (again in the form of a tab: first covering tab 96) to allow the guiding device of the energy feed element to be attached.

Such a double axially protruding zone of said first metal connecting wall may be defined as follows:
axially (X20+X30): between 1.2×D2 and 3×D2 (D2: diameter of the port 74), circumferentially (cumulative lengths Cl of the first and second covering tabs 96, 98): between 6×D2 and 12×D2; see FIG. 8.

With such an embodiment, weight and friction will be significantly reduced, without affecting the mechanical strength.

Figure 5:
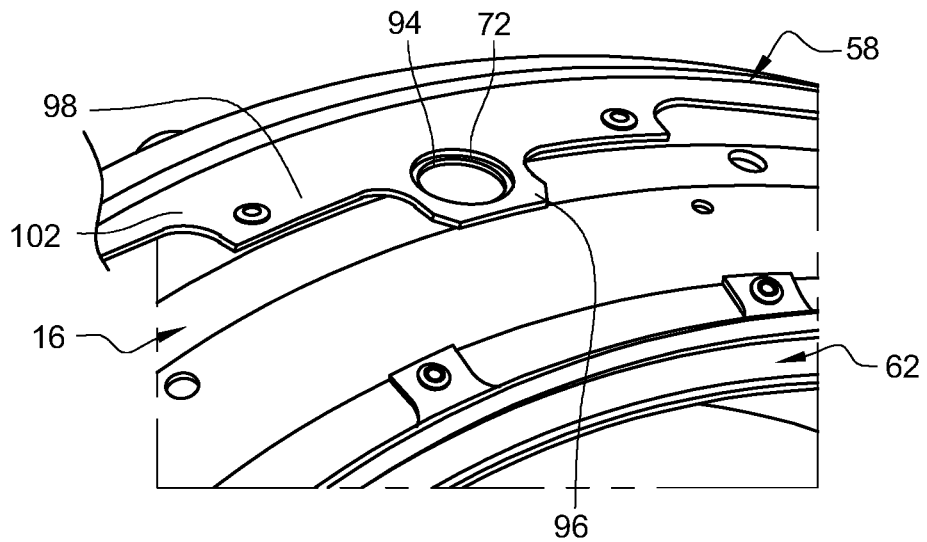
FIG. 5 shows the zone of FIG. 4 before mounting the energy feed element and its guiding device.
Figure 8:
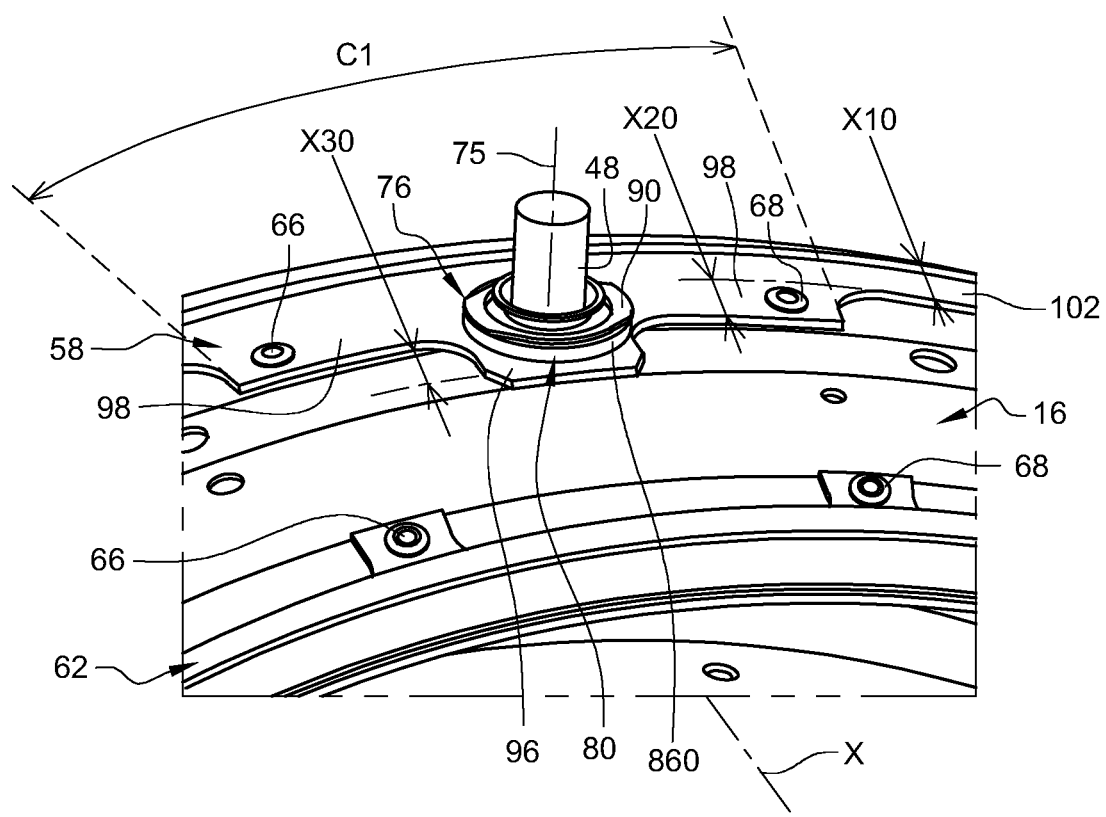
FIG. 8 is a view as in FIG. 5, but after mounting said guiding device and the energy feed element in itself.

As understood, in order to dispose the energy feed element 48 in question, it will therefore be possible to extend locally, downstream, said completely circumferential part 102 of the first metal connecting wall (58 in the example) through which the mounting port 72 is to pass:
firstly, to the second (circumferentially quite long) covering tab 98,
then to said first covering tab 96 (circumferentially shorter, preferably just surrounding the port 72), and which may be circumferentially centred along the second covering tab 98; see FIG. 5 or 8.

It will have been noted that the first and second covering tabs 96, 98 may be defined on a portion of a cylinder of axis parallel to the axis X1.

The invention claimed is:

1. An aircraft gas turbomachine part having a first axis (X) and comprising an annular outer casing (12) coaxial with said first axis (X), an annular inner casing (14), coaxial with said first axis (X), and a space (9) surrounding an annular combustion chamber (10) about the first axis (X), the space (9) being delimited between the outer casing (12) and the inner casing (14), the annular combustion chamber comprising:
a radially inner annular refractory material wall and a radially outer annular refractory material walls, with respect to the first axis (X), an annular chamber bottom (20) extending between said radially inner annular refractory material wall and said radially outer annular refractory material wall having first openings (43) for the passage of devices (2) for injecting an air and fuel mixture attached to the annular chamber bottom (20), a first inner annular metal connecting wall and a first outer annular metal connecting wall with respect to the first axis (X), to which are attached:
said radially inner annular refractory material wall and said radially outer annular refractory material wall (16, 18), respectively, and
the annular chamber bottom (20), two ports (72, 74) passing coaxially through, respectively:
one of said first inner annular metal connecting wall and said first outer annular metal connecting wall (58, 60), and
one of said radially inner annular refractory material wall and said radially outer annular refractory material wall (16, 18) which the respective one of said first inner annular metal connecting wall and said first outer annular metal connecting wall (58, 60) covers, and a guiding device (76), for guiding an energy feed element (48) into said two ports (72, 74), the annular combustion chamber being characterised in that the guiding device (76) is attached with one of said first inner annular metal connecting wall and said first outer annular metal connecting wall (58, 60), wherein along the radially inner refractory material wall or the radially outer annular refractory material wall, said port (72) which passes through said first inner annular metal connecting wall or said first outer annular metal connecting wall (58, 60) is formed in a first covering tab (96) which protrudes relative to a second covering tab (98);

wherein the second covering tab protrudes relative to a part (102) of said first inner annular metal connecting wall or said first outer annular metal connecting wall which extends circumferentially about said first axis (X), and where attachment pins (66, 68) attach one of said first inner annular metal connecting wall or said first outer annular metal connecting wall to one of the radially inner annular refractory material wall or the radially outer annular refractory material wall by passing therethrough on either side of the first covering tab (96).

2. The aircraft gas turbomachine part according to claim 1, wherein for said attachment, the guiding device comprises a metal flange (80) and a floating bushing (82) floatingly mounted in the metal flange (80), wherein the energy feed element (48) passes coaxially through the floating bushing and the metal flange, the metal flange being attached with one of said first inner annular metal connecting wall and said first outer annular metal connecting wall(58, 60).

3. The aircraft gas turbomachine part according to claim 1, wherein, for the attachment with one of said first inner annular metal connecting wall and said first outer annular metal connecting wall, the attached guiding device (76) is shrink fit or welded with one of said first inner annular metal connecting wall and said first outer annular metal connecting wall (58, 60).

4. The aircraft gas turbomachine part according to claim 2, which comprises, for attaching the metal flange (80), an intermediate attachment bushing (84) attached to the metal flange (80) and to one of said first inner annular metal connecting wall and said first outer annular metal connecting wall (58, 60).

5. The aircraft gas turbomachine part according to claim 4, wherein:
the metal flange (80) has a shank (86) parallel to the axis of said two ports (72, 74) and which is engaged in the port (72) of one of said first inner annular metal connecting wall and said first outer annular metal connecting wall (58, 60), and
the intermediate attachment bushing (84) is shrink fit or welded with said one of said first inner annular metal connecting wall and said first outer annular metal connecting wall and said shank (86), and interposed between said first inner annular metal connecting wall and said first outer annular metal connecting wall.

6. The aircraft gas turbomachine part according to claim 5 wherein, in parallel to the axis (75) of said two ports (72, 74), the shank (86) of the metal flange (80) is interrupted at a distance from said one of said inner and outer refractory material walls (16, 18).

7. The aircraft gas turbomachine part according to claim 1, wherein the port (72) present in one of the first inner annular metal connecting wall and the first outer annular metal connecting walls (58, 60) has a diameter (D2) larger than the diameter (D1) of the port (74) present in one of said radially inner annular refractory material and said radially outer annular refractory material wall (16, 18).

8. The aircraft gas turbomachine part according to claim 7, wherein:
the intermediate attachment bushing (84) has an internal diameter, an external diameter and a thickness (e1) between the internal diameter and the external diameters, and
the difference in diameters (D1, D2) between said two ports (72, 74) is greater than the thickness (e1) of the intermediate attachment bushing.

9. The aircraft gas turbomachine part according to claim 5, wherein:
the floating bushing (82) has an outer edge (830) guided transversely into an internal annular groove (88) of the metal flange,
the shank of the metal flange (80) flares (840) to define a bottom of said internal annular groove and peripherally extends to a flanged edge (860) where a cup (90) is attached, so that said outer edge (830) of the floating bushing is guided between said bottom and the cup, and
the flare (840) of the shank (86) of the metal flange is located outside the intermediate attachment bushing (84).

10. The aircraft gas turbomachine part according to claim 9, wherein the flare (840) of the shank of the metal flange (80) is supported by the intermediate attachment bushing (84).

11. The aircraft gas turbomachine part according to claim 2, which comprises, for attaching the metal flange (80), an intermediate attachment bushing (84) attached to the metal flange (80) and to one of said first inner annular metal connecting wall and said first outer annular metal connecting wall (58, 60),
wherein the port (72) present in one of the first inner annular metal connecting wall and the first outer annular metal connecting wall (58, 60) has a diameter (D2) larger than the diameter (D1) of the port (74) present in one of said radially inner annular refractory material wall and said radially outer annular refractory material wall (16, 18).

12. The aircraft gas turbomachine part according to claim 3, wherein:
- the intermediate attachment bushing (84) has an internal diameter, an external diameter and a thickness (e1) between the internal diameter and the external diameters, and
- the difference in diameters (D1, D2) between said two ports (72, 74) is greater than the thickness (e1) of the intermediate attachment bushing.

13. The aircraft gas turbomachine part according to claim 2, further comprising an intermediate attachment bushing (84) for attaching the metal flange (80) to one of said first inner annular metal connecting wall and said first outer annular metal connecting wall (58, 60),
- the metal flange (80) has a shank (86) parallel to the axis of said two ports (72, 74) and which is engaged in the port (72) of one of said first inner annular metal connecting wall and said first outer annular metal connecting wall (58, 60), and
- the intermediate attachment bushing (84) is shrink fit or welded with the first inner annular metal connecting wall or the first outer annular metal connecting wall and said shank (86), and interposed between said first inner annular metal connecting wall or said first outer annular metal connecting wall and said shank.

* * * * *